INVENTORS
SIDNEY METZGER
ROBERT W. HUGHES
BRUCE McADAMS
BY Percy P. Lantzy
ATTORNEY Nov. 20, 1956 S. METZGER ET AL 2,771,553

MULTIPLEX DEMODULATOR

Filed Nov. 3, 1952 2 Sheets-Sheet 2

INVENTORS
SIDNEY METZGER
ROBERT W. HUGHES
BRUCE McADAMS

BY Percy P. Lantzy

ATTORNEY

2,771,553

MULTIPLEX DEMODULATOR

Sidney Metzger, Bergenfield, Robert W. Hughes, Mountain Lakes, and Bruce McAdams, North Arlington, N. J., assignors to International Telephone and Telegraph Corporation, a corporation of Maryland Application November 3, 1952, Serial No. 318,456

4 Claims. (Cl. 250—27)

This invention relates to a multichannel pulse signaling system and more particularly to a PTM (pulse time modulation) demodulator to derive directly the intelligence of a selected one of a plurality of information channels of a PTM multiplex system.

An object of this invention is the provision of a circuit to simultaneously separate and demodulate each of the signal pulses of a given channel of an interleaved multichannel pulse train.

Another object of this invention is the provision of a circuit for simultaneously separating and translating time modulated pulses of a given channel from a multichannel pulse train directly into width modulated pulses.

A further object of this invention is to provide a PTM demodulator wherein the time modulation of the pulses of a channel are translated into width modulated pulses having sufficient audio power therein to drive the audio utilization circuit without requiring preliminary amplifications.

A feature of this invention is the provision of a blocking oscillator type of circuit which operates to separate time modulated pulses of a given channel from an interleaved multichannel pulse train and simultaneously therewith to translate the time modulation of the channel pulses into width modulated pulses having sufficient audio power to recover directly the intelligence signal by means of a low-pass filter. Another feature is the provision of a multivibrator type of circuit which has a similar channel separating and demodulating functions.

The above-mentioned and other features and objects of this invention will become more apparent with the reference of the following description taken in conjunction with the accompanying drawings, in which.

Figures 1, 2:
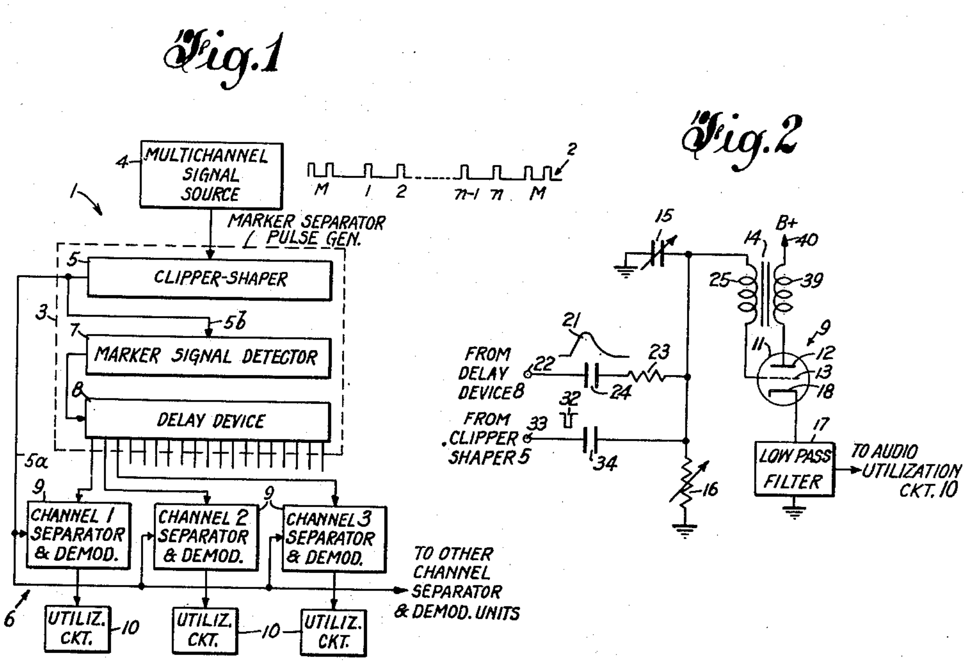
Fig. 1 illustrates in block diagram of a PTM multiplex demodulator employing channel demodulators in accordance with the principle of this invention.
Fig. 2 is a schematic diagram of a single channel demodulator of the blocking oscillator type that may be incorporated in the system shown in Fig. 1.

Referring to Fig. 1, the multiplex demodulator equipment 1 is shown in a simplified block diagram wherein an input pulse train 2, comprising a marker pulse M and up to *n* channels of interleaved time modulated pulses, is applied to a marker-separator-pulse generator 3 from a multichannel signal source 4. The multichannel signal source may comprise any known R. F. receiver employed to receive a pulse time modulated radio frequency carrier propagated from the radio frequency section of a PTM transmitter. Pulse train 2 is coupled to a known form of clipper-shaper 5 wherein pulses are amplified and shaped. The output from shaper 5 is coupled over line 5*a* to the multiplex demodulator section 6. The output is also applied over line 5*b* to a marker signal detector 7 for separation of the marker signal which in turn is applied to delay circuit 8. Demodulator section 6 comprises a number of channel demodulator units 9 which may equal the number of channels employed in the signaling system, the units being arranged to separate the pulses of corresponding channels from pulse train 2 and simultaneously demodulate these separated channels.

Marker detector 7 receives pulse train 2 and detects therefrom the double pulse marker M and converts it to a suitable triangular waveform. The patent of D. D. Grieg #2,485,591 as well as the patents and applications therein cited disclose details of the marker pulse separation at the receiver and also the production of the marker pulses including the interleaving of the channel pulses with the marker pulses at the transmitter end of a system.

The waveform derived from detector 7 is applied to a known delay device 8 of the type having a number of sections adapted to deliver for each input marker signal a series of output pulses corresponding to the number of channels, the first output pulse being delayed 5.2 microseconds from the marker input pulse, the remainder of each series of output pulses being delayed successively 5.2 microseconds from the preceding pulse.

The output pulses from device 8 provide the control or deblocking pulses for the corresponding demodulators 9. The complete incoming pulse train 2, amplified and reshaped by clipper-shaper 5, is applied to each of the channel demodulators 9. The individual channel demodulators are biased beyond cut-off, and therefore the incoming communicating pulse train has no effect unless the corresponding deblocking pulse from delay device 8 is simultaneously present. When the deblocking pulse is applied to a particular channel demodulator, separation and demodulation of the corresponding channel pulse is performed.

Demodulation of a single channel is performed by converting the position modulated or time modulated pulse to a width modulated pulse in a circuit which will develop enough audio signal power to enable the extraction of the audio signal directly from the width modulated pulse by means of a low-pass filter. The demodulator circuitry, having sequence of operation in a given time interval greater than the timing of pulses of each channel, is initiated into a given operation by the appropriate deblocking pulse and remains in this condition until the corresponding channel pulse arrives which has enough amplitude to terminate said given operation. The leading edge of the derived pulse will always occur at the same relative time, but the trailing edge corresponds in position to the time modulation of the communication channel pulse, hence a pulse width modulated signal is obtained and the corresponding channel pulse is separated from train 2. The channel demodulator circuitry is so arranged that sufficient audio signal power is developed in the PWM signal to drive a low-pass filter for directly extracting the audio signal from the PWM signal, the audio signal of each channel being coupled to an audio utilization circuit 10. This extracted audio signal will substantially correspond to the modulation signal introduced at a distant multiplex modulator.

The discovery of extracting the necessary audio signal directly from the PWM signal, eliminating the audio amplifier in each channel of the multiplex demodulator 6 amounts to a considerable saving in multichannel PTM equipment. In practice, to obtain +4 dbm (decibels above or below 1 milliwatt) or 2.5 milliwatt of audio power from each channel demodulator, it is necessary to feed a 200 volt PWM signal into a 600 ohm audio or low-pass filter, or other suitable combinations of PWM signal amplitude and filter impedance. This requirement for operation is obtainable by using a blocking oscillator, as illustrated in Fig. 2, which is triggered on by a delay device 8 gating pulse and driven off by the proper channel pulse thereby obtaining conversion to PWM for a particular intelligence channel. The regenerative circuit between the anode and control grid of an electron discharge device aids in obtaining the necessary 330 ma. to produce the 200 volts across 600 ohms, or any other equivalent current impedance and voltage depending upon a predetermined circuit arrangement.

Referring to Fig. 2, the circuitry is shown for one of a plurality of identical channel demodulators 9 located in the multiplex demodulator 6 of Fig. 1. Channel demodulator 9 comprises an electron discharge device 11, and a pulse transformer 14 coupling energy between the anode 12 and grid 13, an RC time constant including condenser 15 and resistor 16 in the grid circuit of device 11, and a low-pass filter 17 coupled to the cathode 18 of device 11. The filter extracts the audio signal, to be coupled to the utilization circuit 10 of Fig. 1, from the PWM signal derived from a series of PTM pulses carried by a particular communication channel.

Figure 3:
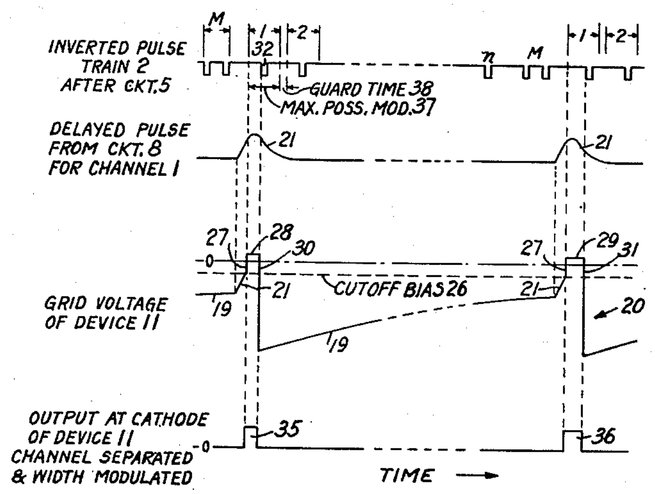
Fig. 3 is a graphical represenatation useful in explaining the operation of the channel demodulator of Fig. 2.

Device 11 is held non-conductive by the negative charge on condenser 15, thereby biasing grid 13 below cut-off. This electrostatic charge leaks off through resistor 16 in the manner shown in Fig. 3 by the segment 19 of curve 20, such that the negative voltage on grid 13 decreases in the manner shown. This build-up and decay of negative bias on grid 13 may be considered the normal or cyclic operating condition of the blocking oscillator without external triggering and as is well known has a repetition rate controlled by the values of condenser 15 and resistor 16. For this application it is desirable that the duration of decay be slightly greater than the repetition rate of the channel pulses. The positive gate pulse 21 (Fig. 2 and Fig. 3) from delay device 8 is applied to the grid 13 through terminal 22, a coupling resister 23 and condenser 24, and the secondary 25 of the pulse transformer 14. When the value of the gate pulse 21 reaches the cut-off bias, shown by line 26 of curve 20 in Fig. 3, device 11 is rendered conductive. Segment 27 of curve 20 illustrates the triggering on of device 11. The point at which device 11 is made conductive occurs substantially at the same voltage level on pulse 21, producing the leading edge 27 of pulse 28 and 29 shown in curve 20 of Fig. 3 with reference to the marker or synchronizing pulse of the pulse train 2 of Fig. 1. The trailing edges 30 and 31 of the derived PWM pulses 28 and 29 will vary according to the time modulation of the particular channel pulse being demodulated as illustrated in Fig. 3 wherein the sequence of operation of this embodiment may be followed graphically. Pulse train 2 is shown to be inverted by circuit 5 to return device 11 to its non-conducting state upon occurrence of the leading edge of the corresponding channel pulse.

Once the device 11 is made conductive it will stay conductive until the proper channel pulse included in train 2, such as pulse 32 of channel one is applied to the grid 13 through terminal 33. Thus, device 11 is driven into non-conduction and condenser 15 is charged up with a negative value of voltage substantially the same as prior to the start of the preceding cycle to prepare the circuitry for another cycle of operation. The time at which pulse 32 arrives at grid 13 through coupling condenser 34 determines the position of trailing edges 30 and 31 of pulses 28 and 29, and thus, the width modulation of a particular channel in pulse train 2 as represented by pulses 35 and 36 of Fig. 3. Each channel of train 2 has a limit of time modulation as represented by time interval 37 and is provided with a guard time to reduce cross-talk as represented by time interval 38.

The primary 39 of transformer 14 is coupled to anode 12 of device 11 and an anode power source coupled to terminal 40 aid in establishing the operating potential of device 11 and providing regenerative feedback to grid 13 through the secondary 25 of transformer 14 increasing the current being drawn through device 11 in preparation to meeting the predetermined current specifications as hereinabove mentioned for extracting the audio signal directly from the PWM signal by means of low-pass filter 17.

The width modulated pulses 35 and 36 are removed from the cathode 18 of device 11 and are shown in Fig. 3. The PWM signal is removed from the cathode 18 to avoid overshoots and transients that would occur in the anode circuit of device 11 due to the inherent behavior of transformer 14 which takes time to respond to a change of condition. The output voltage of device 11 is applied to a low-pass filter 17 having a predetermined amount of impedance, for this embodiment, 600 ohms, from which is removed the audio signal with sufficient power to activate the utilization circuit 10. Circuit 10 may comprise any number of known means to recover the transmitted intelligence as for example an audio speaker, a recorder, or other such equipment.

Figure 4:
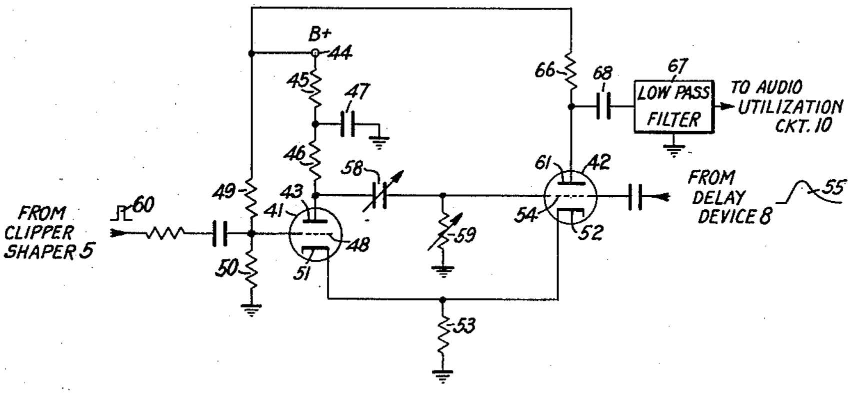
Fig. 4 is a schematic diagram of a multivibrator type of circuit that may be employed as a single channel demodulator in the system shown in Fig. 1.

Another embodiment for converting PTM pulses to PWM pulses with the latter containing sufficient audio power to drive a low-pass filter for direct extraction of the audio signal employs a single shot type of multivibrator circuit illustrated in Fig. 4. The circuit is capable of a greater voltage swing than the circuit of Fig. 2, but not as great a current change. The channel demodulator embodiment of Fig. 4 comprises electron discharge devices 41 and 42 and circuitry associated therewith to effectively provide a single shot multivibrator circuit, which is easily modified to provide a flip-flop or multivibrator oscillator circuit to perform in substantially the same manner as the circuit herein described provided the repetition rate of the multivibrator is less than the average repetition rate of the channel pulses. The anode 43 of device 41 is coupled to a supply voltage at terminal 44 through load resistors 45 and 46, the junction therebetween being provided with an RF ground by means of condenser 47. The grid 48 of device 41 is returned also to terminal 44 via resistors 49, with resistors 49 and 50 behaving as a voltage divider to apply the proper bias to device 41, such that a large amount of current flows through device 41. Cathode 51 of device 41 and cathode 52 of device 42 have a common cathode resistor 53 and by virtue of the large current drawn by device 41 through the common resistor 53, the cathodes 51 and 52 are considerably positive with respect to ground, cutting off device 42 to provide an unchanging operating condition until a triggering pulse is applied to grid 54 of device 42.

A gate pulse 55 from delay device 8 is applied to grid 54 which causes a change from the quiescent or normal operating condition. As observed in curve 56 of Fig. 5 the grid 54 is below the cut-off line 57 until pulse 55 is applied thereto. This pulse drives grid 54 above the cut-off line 57 such that the current in device 41 is switched abruptly to device 42. If left in this condition, the time constant of condenser 58 and resistor 59 would in a predetermined length of time return the circuit to its original quiescent or normal operating condition. However, the time constant is made relatively long herein so that a channel pulse 60 for the corresponding communication channel, channel one herein, can force the circuit back into its quiescent or normal state producing a PWM pulse 62 at the anode 61 of device 42 as shown in curve 63 of Fig. 5. As in the embodiment of Fig. 2 the leading edge 64 of the PWM pulse occurs at the same relative voltage level on pulse 55, but the position of the trailing edge 65 will vary in accordance with the relative position of the time modulated channel pulses.

The load resistor 66 is coupled between the anode 61 and terminal 44 providing a means for developing a series of pulses, as shown in curve 63, for application to the filter 67 through condenser 68. Filter 67 having a proper amount of impedance for the amplitude of the width modulated pulses extracts the audio-signal with sufficient power to drive the utilization circuit 10.

Figure 5:
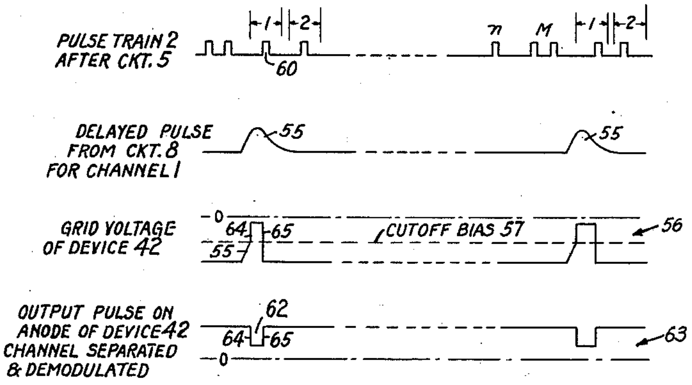
Fig. 5 is a graphical representation useful in explaining the operation of the channel demodulator of Fig. 4.

The multivibrator circuit of Fig. 4 can be modified by adding a condenser and resistor similar to components 58 and 59 between anode 61 and grid 41 with the time constant thereof arranged such that the time for one half of the multivibrator cycle or normal operating condition is slightly greater than the repetition rate of the channel pulses enabling the gate pulse to change the conducting condition of the devices and thereby enabling the corresponding channel pulse to return the circuit to its normal operating condition, thus, providing a simultaneous channel separation and demodulation as described in connection with Figs. 4 and 5.

In these embodiments two substantially simultaneous pulses are needed to bring about the channel separation and demodulation for any particular channel. Although the complete pulse train is applied to each channel demodulator, a particular channel demodulator will not operate unless the delay pulse and channel pulse are present simultaneous, or at least are together within the modulating range of a particular channel pulse. Therefore, an embodiment of a channel demodulator employing the principles of this invention produces the required audio detection for audio utilization minus the heretofore required audio amplifier, providing a saving in the cost of a PTM system.

While we have described above the principles of our invention in connection with specific apparatus, it is to be clearly understood that this description is made only by way of example and not as a limitation to the scope of our invention, as set forth in the objects thereof and in the accompanying claims.

We claim:

1. In a multiplex pulse communication system wherein a marker signal is followed by a train of interleaved time modulated channel pulses; detector means to detect said marker signal, means responsive to said detected marker signal to produce a plurality of differently timed gating pulses each synchronized for the time modulated pulses of a different channel, a plurality of blocking oscillator circuits each having a first and second conduction condition to separate from and demodulate the corresponding channel pulses of said train of pulses, means including an RC time constant network to normally maintain each of said oscillator circuits at said first conduction condition for a time interval greater than the time interval between successive pulses of each channel, means to apply the gating pulses to respective ones of said oscillator circuits to trigger said oscillator circuits into said second conduction condition to establish a substantially constant time positioned leading edge for corresponding channel width modulated output pulses, means to apply the said train of pulses to each of said oscillator circuits, the pulses of the corresponding channel returning said oscillator to said first conduction condition to establish the trailing edge for said width modulated output pulses in accordance with the time modulated condition of the pulses of said corresponding channel, and extraction means coupled to the output of each of said oscillator circuits for direct removal of the audio intelligence from said width modulated output pulses.

2. In a pulse communication system wherein a reference signal is followed by a time modulated channel pulse; detector means to detect said reference signal, means responsive to said detected reference signal to produce a gating pulse synchronized for the time modulated channel pulse, a normally non-conductive blocking oscillator circuit to demodulate said time modulated channel pulse including an electron discharge device having at least an anode, a cathode, and a control grid and a blocking oscillator transformer having one end of a first winding connected to said control grid and one end of a second winding connected to said anode, said control grid and said anode being intercoupled by means of the mutual inductance between said first and second winding, the other end of said second winding being connected to an anode voltage source, an RC time constant coupled to the other end of said first winding to maintain said discharge device normally non-conductive for a time interval greater than the time interval between successive pulses of the channel, means to apply the gating pulse to said other end of said first winding to trigger said discharge device into conduction to establish a substantially constant time positioned leading edge for a width modulated output pulse at said cathode, means to apply the said channel pulses to said other end of said first winding to render said discharge device non-conductive to establish the trailing edge for said width modulated output pulse in accordance with the time modulated condition of said channel pulse, and extraction means coupled to said cathode for direct removal of the audio intelligence from said width modulated output pulse.

3. In a multiplex pulse communication system wherein a marker signal is followed by a train of interleaved time modulated channel pulses; detector means to detect said marker signal, means responsive to said detected marker signal to produce a plurality of differently timed gating pulses each synchronized for the time modulated pulses of a different channel, a plurality of blocking oscillator circuits each having a first and second conduction condition to separate from and demodulate the corresponding channel pulses of said train of pulses, means including an RC time constant network to normally maintain each of said oscillator circuits at said first conduction condition for a time interval greater than the time interval between successive pulses of each channel, means to apply the gating pulses to respective ones of said oscillator circuits to trigger said oscillator circuits into said second conduction condition to establish a substantially constant time positioned leading edge for corresponding channel width modulated output pulses, and means to apply the said train of pulses to each of said oscillator circuits, the pulses of the corresponding channel returning said oscillator to said first conduction condition to establish the trailing edge for said width modulated output pulses in accordance with the time modulated condition of the pulses of said corresponding channel.

4. In a pulse communication system wherein a reference signal is followed by a time modulated channel pulse; detector means to detect said reference signal, means responsive to said detected reference signal to produce a gating pulse synchronized for the time modulated channel pulse, a normally non-conductive blocking oscillator circuit to demodulate said time modulated channel pulse including an electron discharge device having at least an anode, a cathode, and a control grid and a blocking oscillator transformer having one end of a first winding connected to said control grid and one end of a second winding connected to said anode, said control grid and said anode being intercoupled by means of the mutual inductance between said first and second winding, the other end of said second winding being connected to an anode voltage source, an RC time constant coupled to the other end of said first winding to maintain said discharge device normally non-conductive for a time interval greater than the time interval between successive pulses of the channel, means to apply the gating pulse to said other end of said first winding to trigger said discharge device into conduction to establish a substantially constant time positioned leading edge for a width modulated output pulse at said cathode, and means to apply the said channel pulses to said other end of said first winding to render said discharge device non-conductive to establish the trailing edge for said width modulated output pulse in accordance with the time modulated condition of said channel pulse.

References Cited in the file of this patent

UNITED STATES PATENTS

| | | |
|---|---|---|
| 2,266,401 | Reeves | Dec. 16, 1941 |
| 2,445,775 | Grieg | July 27, 1948 |
| 2,462,100 | Hollabaugh | Feb. 22, 1949 |
| 2,492,736 | Custin | Dec. 27, 1949 |
| 2,510,987 | Levy | June 13, 1950 |
| 2,632,880 | Flowers | Mar. 24, 1953 |
| 2,659,008 | Floyd | Nov. 10, 1953 |